United States Patent [19]

Armstrong

[11] Patent Number: 5,136,839
[45] Date of Patent: Aug. 11, 1992

[54] DUCTED FAN TURBINE ENGINE

[75] Inventor: Norman Armstrong, Newtownards, United Kingdom

[73] Assignee: Short Brothers PLC, Belfast, United Kingdom

[21] Appl. No.: 476,376

[22] PCT Filed: Sep. 27, 1989

[86] PCT No.: PCT/GB89/01137

§ 371 Date: May 23, 1990

§ 102(e) Date: May 23, 1990

[87] PCT Pub. No.: WO90/03309

PCT Pub. Date: Apr. 5, 1990

[30] Foreign Application Priority Data

Sep. 28, 1988 [GB] United Kingdom ............... 8822798

[51] Int. Cl.⁵ .............................................. F02K 3/02
[52] U.S. Cl. .................... 60/226.1; 60/39.31; 244/55
[58] Field of Search .............. 60/226.1, 271, 39.31; 244/54, 55

[56] References Cited

U.S. PATENT DOCUMENTS

| | | | |
|---|---|---|---|
| 4,037,809 | 7/1977 | Legrand | 60/226.1 |
| 4,122,672 | 10/1978 | Lowrie | 60/226.1 |
| 4,790,137 | 12/1988 | Quin | 60/226.1 |

FOREIGN PATENT DOCUMENTS

| | | |
|---|---|---|
| 0245190 | 11/1987 | European Pat. Off. . |
| 0255796 | 2/1988 | European Pat. Off. . |
| 2290350 | 6/1976 | France . |
| 2291091 | 6/1976 | France . |
| 758205 | 10/1956 | United Kingdom . |
| 966522 | 8/1964 | United Kingdom . |
| 1210205 | 10/1970 | United Kingdom . |
| 1236854 | 6/1971 | United Kingdom . |
| 1304212 | 1/1973 | United Kingdom . |
| 1340817 | 12/1973 | United Kingdom . |
| 1375868 | 11/1974 | United Kingdom . |
| 1520759 | 8/1978 | United Kingdom . |
| 1533551 | 11/1978 | United Kingdom . |
| 1543312 | 4/1979 | United Kingdom . |
| 2212859 | 8/1989 | United Kingdom . |

Primary Examiner—Richard A. Bertsch
Assistant Examiner—Michael I. Kocharov

[57] ABSTRACT

A ducted fan turbine engine (2) includes an inner discharge nozzle (18) and an outer discharge nozzle (8) surrounding the inner discharge nozzle. The engine (2) is mounted on an aircraft wing by a pylon. The rear part of this pylon supports rollers which run in guide rails (36) which extend rearwardly along the upper portion of the outer discharge nozzle (8). The outer discharge nozzle (8) is secured in its forward operational position adjacent the engine nacelle by bolting support fittings (38) to the pylon. To remove the remainder of the engine, the support fittings (38) are unbolted from the pylon, a locating device (28) is released from the engine thrust reverser structure, and the outer discharge nozzle (8) and a primary nozzle fairing (22) are rolled rearwardly to a park position. The remainder of the engine can then be removed downwardly from the aircraft.

12 Claims, 6 Drawing Sheets

DUCTED FAN TURBINE ENGINE

The present invention relates to a ducted fan turbine engine, by which is meant a gas turbine engine in which a portion of the net energy is used to drive a ducted fan. The invention is particularly concerned with the outer discharge nozzle of a ducted fan turbine engine.

In the operation of a ducted fan turbine engine, air enters the engine core where it is mixed with fuel which is ignited to rotate a turbine at the rear region of the engine. Rotation of the turbine rotates a fan in the forward region of the engine thereby directing by-pass air to flow rearwardly over the outside of the engine core. The main air stream in the engine core leaves the engine through an inner discharge nozzle, and the by-pass air leaves the engine through an outer discharge nozzle surrounding the inner nozzle.

The outer discharge nozzle is required to withstand the operational pressure conditions, inertia, acoustic fatigue, and creep or other temperature/strength/time-related forms of degradation. The outer nozzle is also required to be constructed to facilitate engine removal.

In order to meet the above-mentioned operational requirements, conventional outer discharge nozzles have been constructed of heat-resistant, high strength/stiffness materials such as titanium, steel and Inconels, and these outer nozzles have either been permanently attached to the engine turbine case, or supported off the aft end of the by-pass duct fixed structure.

The above-mentioned materials are considerably more expensive than for example aluminium alloys both to obtain and to work. In addition, these materials are relatively heavy, which means that outer discharge nozzles constructed of these materials are correspondingly heavy and require suitably robust mounting supports.

In a conventional ducted fan turbine engine, the outer nozzle is supported on the inner or primary nozzle by several struts or vanes extending between the two nozzles. Because of the considerable differences in operational temperature between the inner and outer nozzles, and also because of the internal burst pressure effects, the supporting vanes or struts are subjected to high stresses which cause deformation of both the nozzles. These stresses and deformations have to be allowed for in the design of the engine.

When removing from an aircraft a ducted fan turbine engine equipped with a conventional outer nozzle, either the outer nozzle is removed first from the aircraft to be followed by removal of the remainder of the engine, or the engine including the outer nozzle is removed in one operation. With both these removal techniques, the outer nozzle adds considerably to the complexity of the operation because of its weight and size. It will be appreciated that the outer nozzle is also vulnerable to being damaged during or after its removal from the remainder of the engine.

It is an aim of the invention to alleviate the above-mentioned disadvantages, and according to one aspect of the invention there is provided a ducted fan turbine engine comprising an inner assembly including an inner discharge nozzle, and an outer assembly having a nacelle and an outer discharge nozzle surrounding the inner discharge nozzle, wherein the inner and outer discharge nozzles are separate from one another.

According to another aspect of the invention there is provided a ducted fan turbine engine comprising an inner assembly including an inner discharge nozzle, and an outer assembly having a nacelle and an outer discharge nozzle surrounding the inner discharge nozzle, wherein the outer discharge nozzle is mounted on an aircraft for movement between a forward operational position adjacent the nacelle, and a rearward park position to clear the inner assembly during removal thereof from the aircraft.

The outer discharge nozzle may be movable relative to the aircraft by means of rollers running on guide rails. In the construction in which the guide rails are mounted on the outer discharge nozzle, means may be provided to secure the guide rails to the aircraft to retain the outer discharge nozzle in its operational position. The outer discharge nozzle may be movably mounted on any convenient part of the aircraft such as for example the pylon supporting the engine. In this construction, the rollers may be rotatably mounted on the pylon. The outer discharge nozzle may be made of any suitable light-weight material such as for example a material formed predominantly of aluminium alloys.

Two examples of suitable aluminium alloys have the following specifications:
(1) DTD 5070 produced by the Royal Aircraft Establishment, Farnborough,
(2) 2219 which is a U.S. specification produced in the U.S.A. by the Aluminium Association Inc.

One embodiment of the invention will now be described by way of example with reference to the accompanying illustrative drawings in which.

Figure 1A:
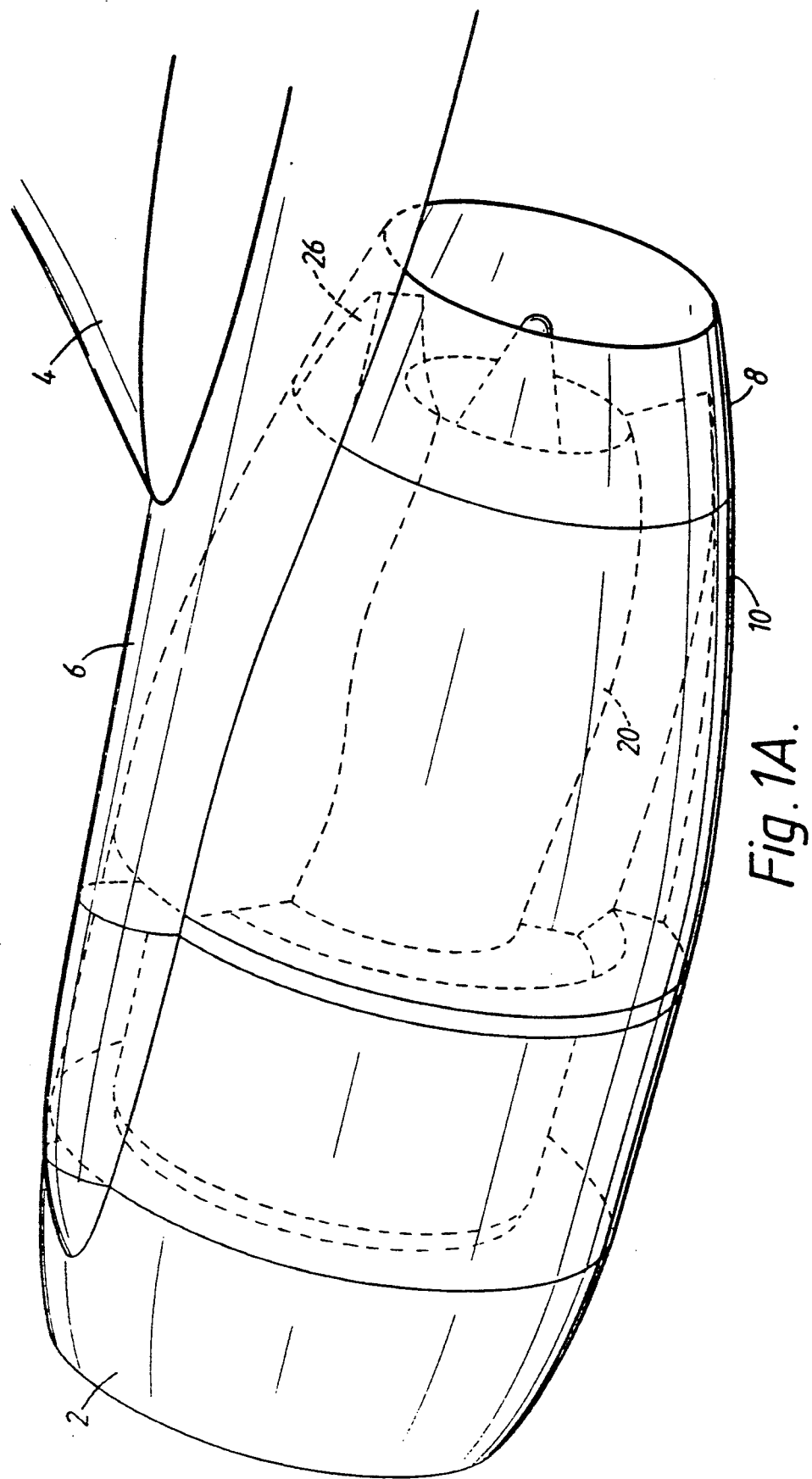
FIG. 1A is a perspective view of a ducted fan turbine engine mounted on a pylon beneath an aircraft wing.

Referring to FIG. 1A, a ducted fan turbine engine 2 is mounted on an aircraft wing 4 by means of a pylon 6. The engine includes at its rear, an outer discharge nozzle 8 which is shaped in the form of a truncated hollow cone open at its forward and rear ends. The forward larger diameter end abuts an engine nacelle 10, and the smaller diameter aft end is open to the atmosphere. The outer discharge nozzle 8 is constructed predominantly of aluminium alloys such as for example the previously mentioned aluminium alloys having the specification DTD 5070 and 2219.

Figure 2:
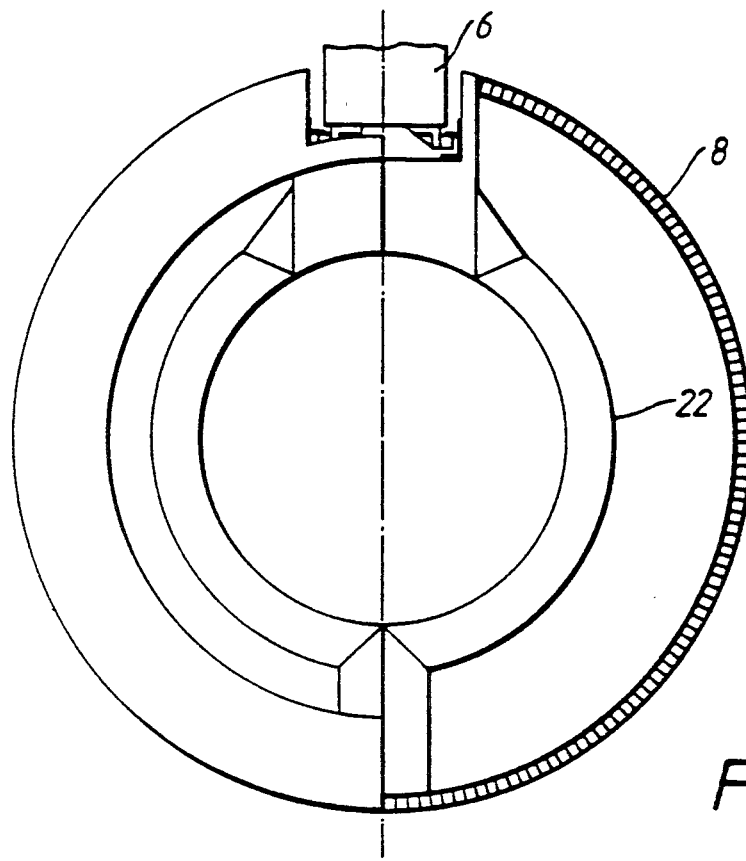
FIG. 2 is a sectional view, partly in section of the rear of the primary nozzle fairing and outer discharge nozzle assembly of FIG. 1B.
Figure 3A:
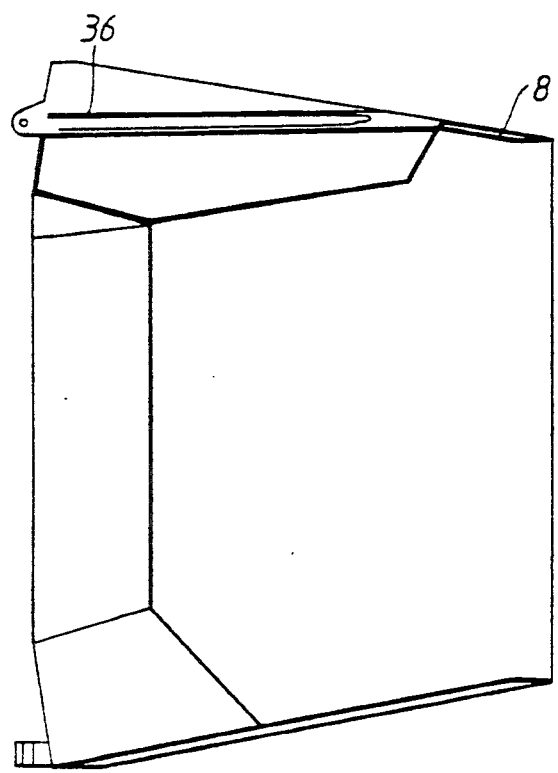
FIG. 3A is a side elevational view in cross section of the primary nozzle fairing and outer discharge nozzle assembly of FIG. 2.
Figure 3B:
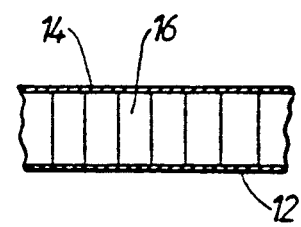
FIG. 3B is an enlarged sectional view of a portion of the material forming the outer discharge nozzle illustrated in FIG. 3A.

Referring to FIG. 2 and FIG. 3B, the outer discharge nozzle 8 is constructed of inner and outer sheet members 12 and 14 separated by a honeycomb core 16. The inner and outer sheet members and the honeycomb core are made of an aluminium alloy, and the sheet members are attached to the honeycomb core by means of an adhesive. The inner sheet member 12 is perforated in order to provide sound attenuation.

Figure 1B:
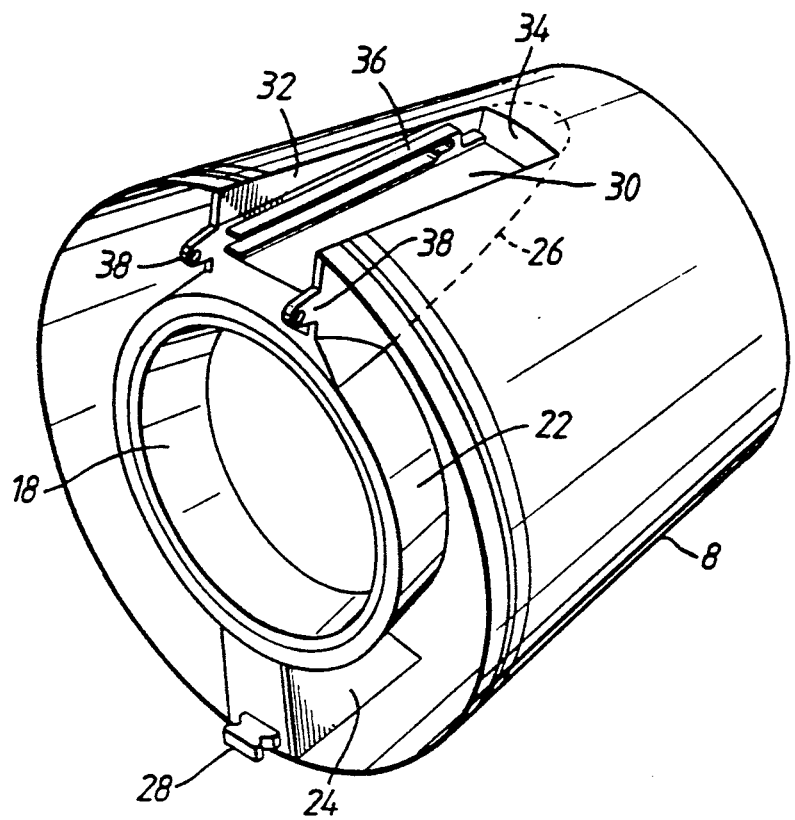
FIG. 1B is a perspective view of the inner and outer discharge nozzles of the fan jet engine of FIG. 1A.
Figure 1C:
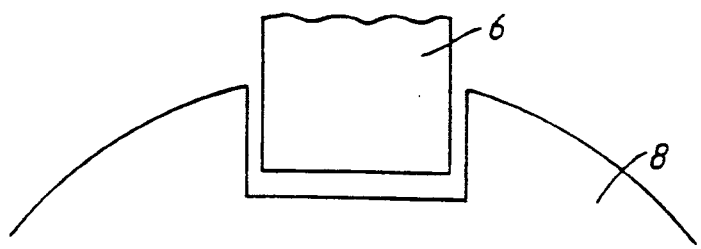
FIG. 1C is a diagrammatic view illustrating the mounting of the outer discharge nozzle of FIG. 1B.
Figure 1D:
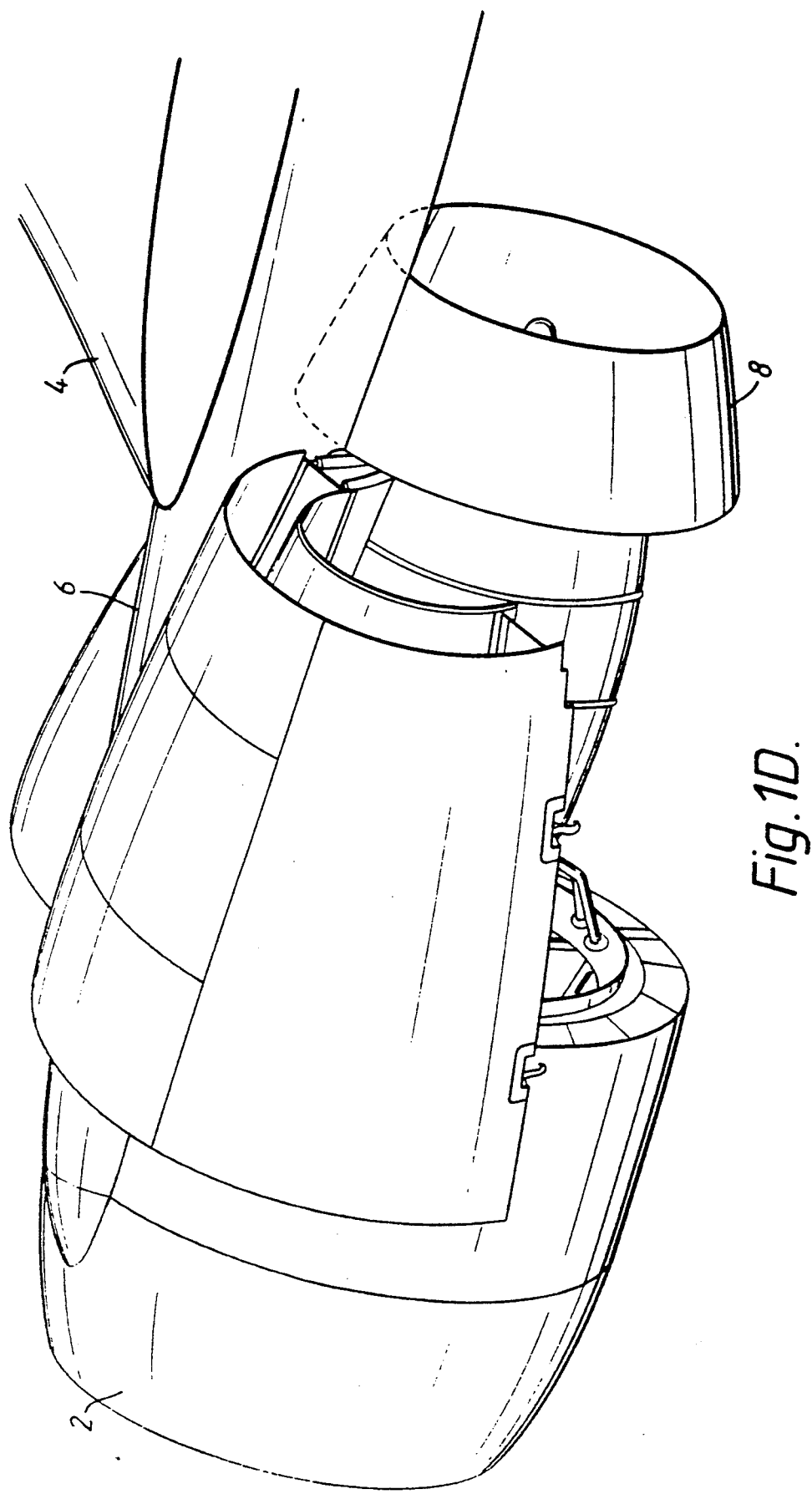
FIG. 1D is a perspective view of the engine of FIG. 1A with the bypass air ducts open.

As shown in FIG. 1B, the outer discharge nozzle 8 is mounted coaxially with an inner discharge nozzle 18 through which the hot engine gases are exhausted from the engine core 20.

A primary nozzle fairing 22 surrounds the inner discharge nozzle 18 and is coaxial with the inner and outer discharge nozzles 18 and 8. This nozzle fairing 22 smooths the by-pass air in the region of the outer discharge nozzle 8.

This nozzle fairing 22 is of hollow truncated conical form open at both ends. Its larger diameter (forward) end lies in a plane approximately parallel to and forward of the plane of the forward edge of the outer discharge nozzle 8.

This primary nozzle fairing 22 is attached to the outer discharge nozzle 8 to form a unitary assembly. The primary nozzle fairing is not attached to the inner discharge nozzle 18.

A bifurcation trailing edge 24 is located between the lower forward part of the inner face of the outer discharge nozzle 8 and the lower outer face of the primary nozzle fairing 22. This trailing edge 24 provides a smooth aerodynamic recombination of the left-hand and right-hand bypass airflows through the engine into a single airflow within the region of the outer discharge nozzle 8. This trailing edge 24 is attached to both the outer discharge nozzle 8 and the primary nozzle fairing 22, and extends a short distance rearwardly of the rearward part of the primary nozzle fairing 22 (see FIG. 3A).

The primary nozzle fairing 22 consists of a conical outer skin with internal ring stiffening members (not shown) and is supported by the outer discharge nozzle 8 through its attachment to a fairing 26 and the lower bifurcation trailing edge 24. A locating device 28 is positioned at the forward end of the bifurcation trailing edge 24.

Figure 4:
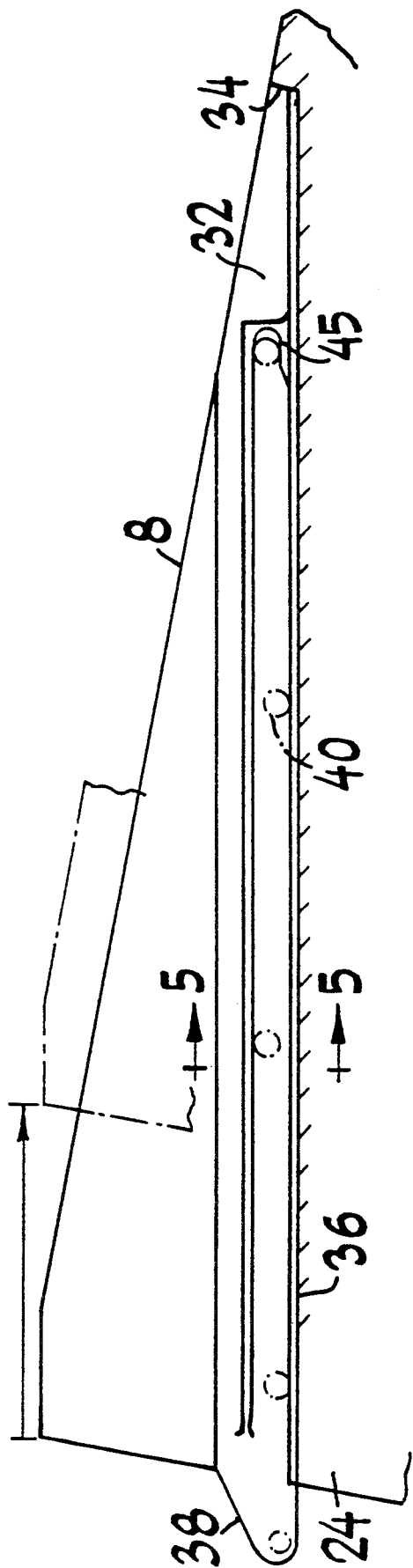
FIG. 4 is an enlarged side elevational view, in partial cross section, of an outer discharge nozzle mounting assembly shown in the upper part of FIG. 3A.

Referring particularly to FIGS. 1B, 3A and 4 a mounting assembly is located at the upper portion of the outer discharge nozzle 8. This mounting assembly includes a base 30 and two side walls 32 extending rearwardly from the front surface of the outer discharge nozzle 8 to an end wall 34. Two guide rails 36 extend one along each of the side walls 32 and two support fittings 38 are located at the forward ends of these guide rails 36.

The mounting assembly is separated from the bypass air flow path by the fairing 26 having its forward end located at the upper part of the primary nozzle fairing 22. The trailing edge of this fairing 26 extends rearwardly and outwardly toward the inner surface of the outer discharge nozzle 8 and meets this inner surface closely behind the end wall 34.

Figure 5:
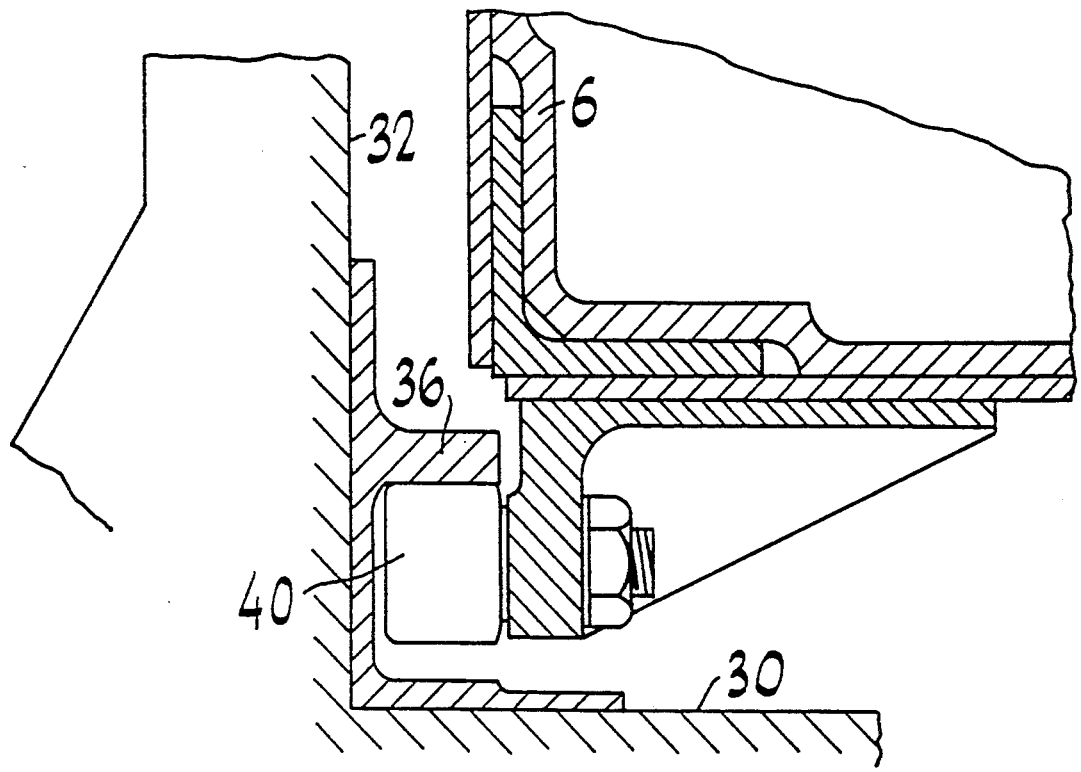
FIG. 5 is a cross-sectional front elevational view of part of the pylon and outer discharge nozzle mounting assembly taken in the direction of arrows 5—5 in FIG. 4.

Referring to FIG. 5, eight rollers 40, which are rotatably mounted on the lower part of the pylon 6, are arranged with four rollers located in each of the guide rails 36 to support the assembly of the outer discharge nozzle 8 and the primary nozzle fairing 22. The guide rails 36 and the rollers 40 are dimensioned and arranged so that the outer discharge nozzle 8 can be moved between a forward operational position adjacent the nacelle 10, and a rearward park position. This park position is sufficiently rearward of the nacelle 10 so that the assembly of the outer discharge nozzle 8 and the primary nozzle fairing 22 clears the aft extremity of the remainder of the engine, including the inner discharge nozzle 18 to allow downward vertical movement of the remainder of the engine 2 from the nacelle 10. FIG. 4 illustrates the two extreme forward and rear positions of the outer discharge nozzle 8. When the outer discharge nozzle is in its extreme forward position the two rearmost rollers 40 are located in constricted rear portions 45 of the guide rails 36.

An advantage of the invention is that the outer discharge nozzle 8 can be made of aluminium alloys which are considerably lighter and cheaper than the materials required in the conventional construction of outer nozzle assemblies. Aluminium alloys have not previously been used in the construction of conventional outer nozzles because of their poor high-temperature performance. During normal operation of a ducted fan turbine engine the hot gases exhausting from the core are shrouded by the cooler bypass air and therefore do not impinge on the outer discharge nozzle structure. During operation of the thrust reverser, however, the by-pass air is diverted forwardly and no longer shrouds the hot exhaust gases from the core. It is envisaged that the outer discharge nozzle 8 will be exposed on its inner surface to an air stream at an elevated temperature for a short period during each flight. By fabricating the outer discharge nozzle 8 so that there is a good thermal pathway between the inner and outer faces of the outer discharge nozzle 8, and by cooling the outer face of the outer discharge nozzle 8 by the external air flow during flight, the heat impinging on the inner face of the outer discharge nozzle 8 is dissipated in and by the outer face.

Figure 6:
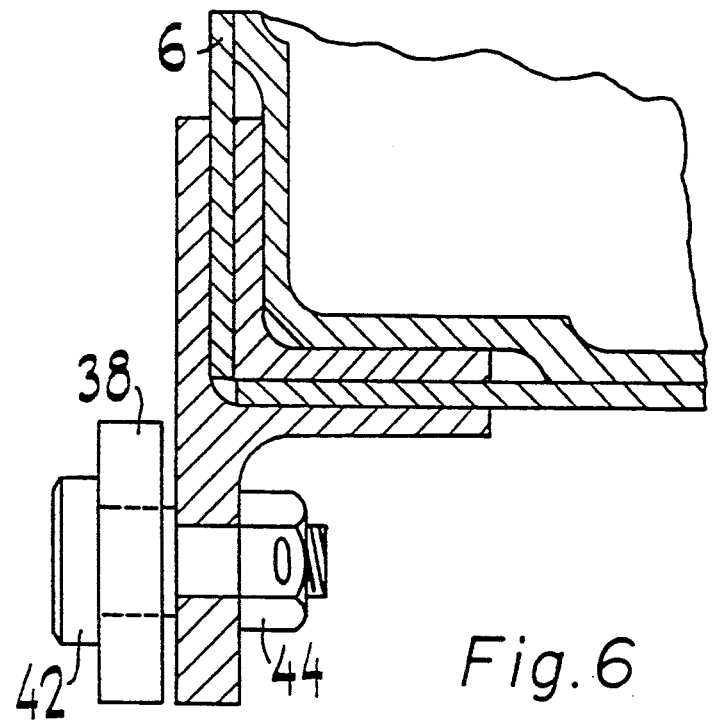
FIG. 6 is a front elevational view, in partial cross section, of part of the upper part of FIG. 4.

When the engine is assembled, the lower part of the aircraft pylon 6 is located in the outer discharge nozzle mounting assembly between the side walls 32 with the rollers 40 located in the guide rails 36. Referring to FIG. 6, the outer discharge nozzle 8 is retained in its forward operational position by bolting the two support fittings 38 (only one fitting shown) to appropriate parts of the aircraft pylon 6 by means of bolts 42 and nuts 44. In this forward operational position the locating device 28 is engaged by the thrust reverser structure (not shown) which is immediately forward of the outer discharge nozzle assembly. When it is required to remove the remainder of the engine, the support fittings 38 are unbolted from the pylon 6, the locating device 28 is released from the thrust reverser structure, and the assembly of the outer discharge nozzle 8 and the primary nozzle fairing 22 is rolled rearwardly to the park position illustrated in FIG. 4. The remainder of the engine can then be removed downwardly from the aircraft without contacting the outer discharge nozzle 8 and the primary nozzle fairing 22.

The adhesive used in the construction of the outer discharge nozzle 8 must have the following properties:

(1) it must not break the thermal pathway between the inner and outer sheet members 12 and 14, (2) it must be capable of being applied in a manner and form that does not occlude the perforations of the inner sheet member 12, and (3) it must retain its properties throughout the operational life of the outer discharge nozzle 8 and throughout the operational temperature range encountered.

It is to be understood that the rollers 40 can be replaced by any suitable slidable members.

I claim:

1. In combination
   a pylon;
   a ducted fan turbine engine mounted on said pylon, said engine including an inner discharge nozzle, a primary nozzle fairing coaxial of and surrounding said inner discharge nozzle, a nacelle disposed about said primary nozzle fairing, and an outer discharge nozzle coaxial of said inner discharge nozzle, said outer discharge nozzle being secured to said fairing;
   a mounting assembly mounted on said outer nozzle; and
   a plurality of rollers mounted on said pylon for rollably supporting said mounting assembly thereon for movement of said outer discharge nozzle and said primary nozzle fairing from a forward operational position adjacent said inner discharge nozzle to a park position spaced from said inner discharge nozzle to allow vertical movement of said inner discharge nozzle with clearance from said outer discharge nozzle and said fairing.

2. An engine as claimed in claim 1 wherein said outer discharge nozzle is made of a suitable lightweight material.

3. An engine as claimed in claim 2 wherein said outer discharge nozzle is made of a material formed predominantly of aluminium alloys.

4. An engine as claimed in claim 3 wherein at least one of the aluminum alloys has the specification:
   DTD 5070 produced by the Royal Aircraft Establishment, Farnborough.

5. An engine as claimed in claim 3 wherein at least one of the aluminium alloys has the specification:
   U.S. specification 2219 produced in the U.S.A. by the Aluminium Association Inc.

6. An engine as claimed in claim 1 wherein the outer discharge nozzle is constructed of inner and outer sheet members separated by a honeycomb core.

7. An engine as claimed in claim 6 wherein said sheet members are attached to the honeycomb core by an adhesive.

8. An engine as claimed in claim 6 or claim 7 wherein said inner sheet member is perforated to provide sound attenuation.

9. The combination as claimed in claim 1 and further comprising guide rails mounted on the outer discharge nozzle, the plurality of rollers being arranged to run on the guide rails.

10. The combination as claimed in claim 9 in which the guide rails are supported in the mounting assembly located at the upper portion of the outer discharge nozzle.

11. The combination as claimed in claim 10 in which the mounting assembly extends rearwardly from a forward surface of the outer discharge nozzle.

12. The combination as claimed in claim 1 and further comprising means to retain the outer discharge nozzle in its operational position.

* * * * *